United States Patent

[11] 3,609,487

| [72] | Inventor | William W. Allison<br>Melville, N.Y. |
|---|---|---|
| [21] | Appl. No. | 870,577 |
| [22] | Filed | Oct. 29, 1969 |
| [45] | Patented | Sept. 28, 1971 |
| [73] | Assignee | Armec Corporation<br>Huntington Station, N.Y.<br>Continuation-in-part of application Ser. No.<br>721,965, Apr. 17, 1968. |

[54] DC MOTOR AND CONSTANT-SPEED CONTROL CIRCUIT
13 Claims, 3 Drawing Figs.

[52] U.S. Cl. .................................................. 318/138,
318/329, 318/331, 318/451
[51] Int. Cl. ...................................................... H02k 27/20
[50] Field of Search ........................................... 318/132,
138, 254, 329, 451, 331; 331/116

[56] References Cited
UNITED STATES PATENTS

| 2,492,435 | 12/1949 | Ostline ............................ | 318/254 |
|---|---|---|---|
| 2,986,686 | 5/1961 | Clifford .......................... | 318/254 |
| 3,150,337 | 9/1964 | Allison .......................... | 331/116 |
| 3,246,224 | 4/1966 | Helfner ......................... | 318/329 |
| 3,333,172 | 7/1967 | Brailsford ..................... | 318/132 |
| 3,349,305 | 10/1967 | Dietsch ......................... | 318/132 |
| 3,407,344 | 10/1968 | Bansho ......................... | 318/132 |

*Primary Examiner*—G. R. Simmons
*Attorneys*—James A. Eisenman and Robert R. Strack ABSTRACT: In accordance with a preferred embodiment of the invention, a DC motor is both driven and controlled through a common winding by providing a circuit which includes both power and control portions and is preferably self-oscillatory in the absence of rotor motion and at a frequency related to desired rotor speed to define, in conjunction with rotor-generated signals, limits of motor speed. The power portion includes an electronic switch and motor current limiter and the control portion includes an amplifier stage to operate the switch and two separate feedback paths are provided from the power portion to the amplifier stage. A mechanical resonator is coupled to the rotor to be excited into resonance as the motor reaches synchronous speed, and an electromagnetic pickup from the resonator feeds a signal into the amplifier stage to furnish a dominating control signal, thus synchronizing the motor to the resonator to achieve precise motor speed while enabling the motor to be either self-starting or, if desired, capable of starting with a very slight push, and to recover synchronous speed following disturbance to rotor speed for any reason including loss of power.

PATENTED SEP 28 1971
3,609,487
FIG. 1
FIG. 2
FIG. 3
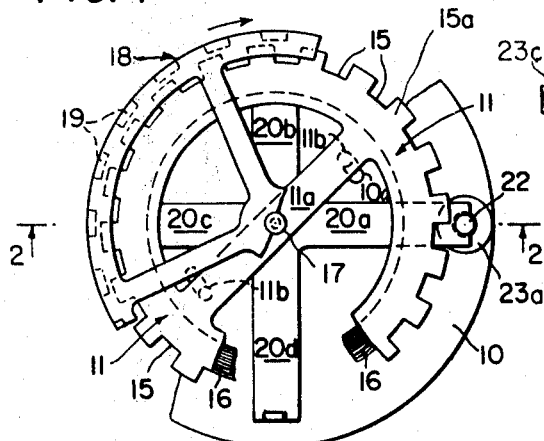
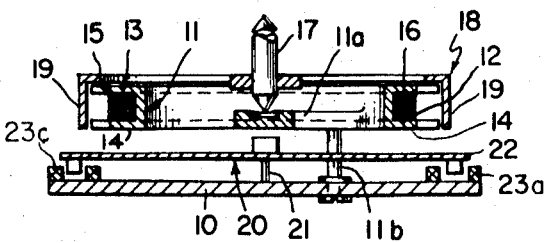
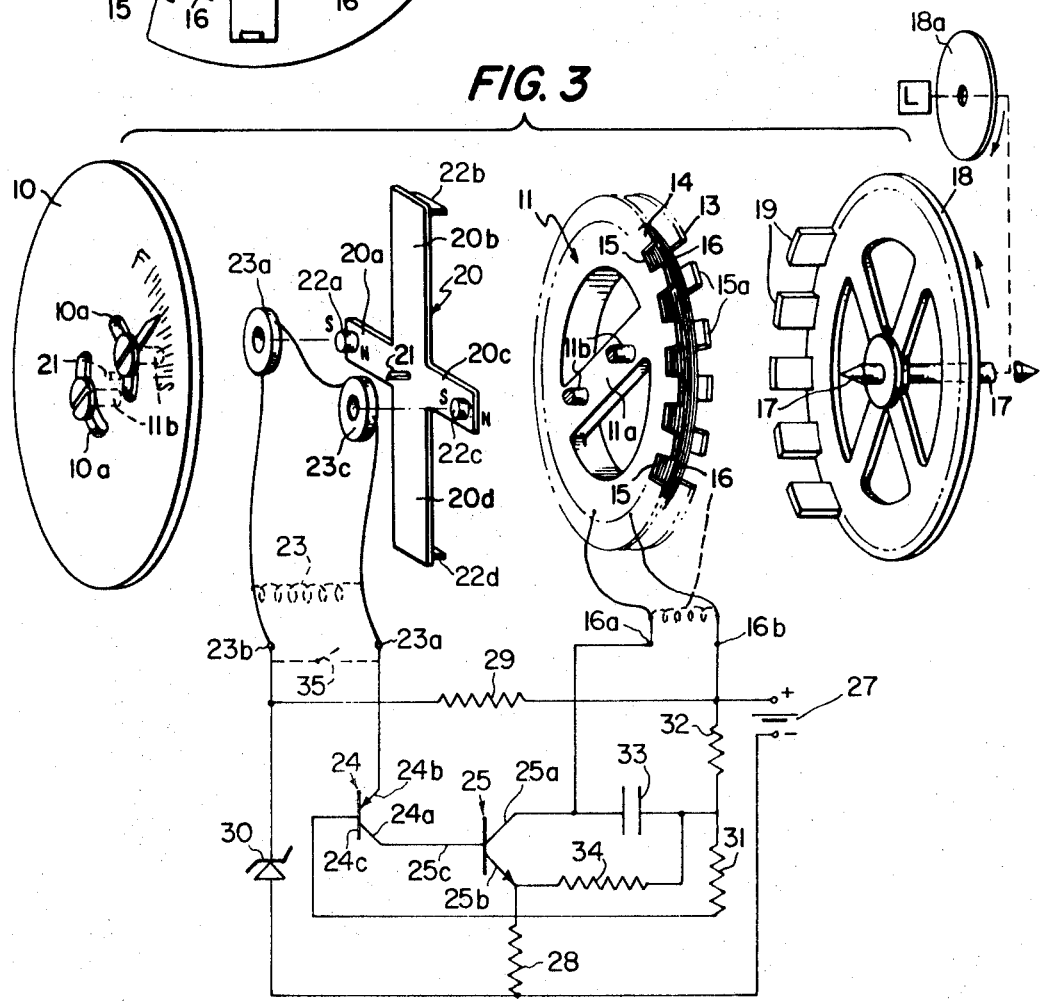
INVENTOR
WILLIAM W. ALLISON
BY
Eisenman & Strack
ATTORNEYS 3,609,487

DC MOTOR AND CONSTANT-SPEED CONTROL CIRCUIT

CROSS-REFERENCE TO OTHER APPLICATION

This application is a continuation-in-part of application Ser. No. 721,965, filed Apr. 17, 1968.

BACKGROUND OF THE INVENTION

The invention relates to DC motors and to control circuitry for the regulated pulse energization thereof, the circuitry also being adaptable for use in conjunction with a frequency reference to make a precision DC timing motor.

A DC motor and control circuitry incorporating its own frequency reference is disclosed in applicant's copending application Ser. No. 721,965, filed Apr. 17, 1968. This motor and circuitry utilizes pickup coil means to sense resonator action and rotor position and motion in relation to stator poles. It exhibits a wide range of performance characteristics which makes it useful as a timing motor such, for example, as a battery-powered timing motor for clocks.

The present invention represents a further advance in the art in that it provides designs which represent a simplification and economy with respect to both electrical and mechanical structure. In addition, it furnishes improved motor control features useful with or without a frequency reference. The invention also renders DC pulse-energized motors highly insensitive to temperature and voltage changes.

SUMMARY OF THE INVENTION

In accordance with the invention, there is provided a DC motor having stator and rotor structures inductively coupled to a motor winding adapted to be energized through a power and control circuit which furnishes driving pulses capable of starting the motor and controlling its upper speed both generally and precisely. Precise control can be achieved by synchronism with the frequency of an integrated precision frequency reference system. When operated with the frequency reference, the system is capable of automatically finding synchronism when off speed. To this end, the resonator can be coupled both the means for driving the motor and for furnishing signals which actuate the circuitry. The circuit constitutes an electronic switch and current control in series with the motor winding and a source of DC power, and the system is preferably made self-oscillatory in the absence of rotor motion over a particular band of frequencies. The action of the circuit is such that the switch is opened and closed in response to electrical signals to the circuit. In the attracting mode of operation of the motor, i.e. where torque pulses to the rotor result from increased magnetic attraction between rotor and stator poles when current is flowing in the motor winding, the switch is opened when the rotor and stator pole portions are approximately at their closest proximity and is closed when the rotor poles are approximately midway between stator poles. It is understood that in a repulsion mode, the opening and closing of the switch are reversed. A frequency reference in the form of a mecanical resonator can be coupled to the rotor, as by magnets for example, to be excited into resonance when the motor approaches synchronous speed, and at resonance generates control signals which are fed into the circuit so that they dominate the action to controlthe electronic switch.

BRIEF DESCRIPTION OF THE DRAWINGS

FIG. 1 is a plan view of a DC motor in which the rotor portion is partly broken away to reveal the stator and a mechanical frequency reference which maintains the motor at a precise speed synchronized therewith;

FIG. 2 is a view in vertical section taken on the line 2—2 of FIG. 1 looking in the direction of the arrows;

FIG. 3 is a diagrammatic view, exploded and in perspective, of the motor of FIGS. 1 and 2, and includes a circuit having control and power portions and which renders the motor capable of synchronization with the frequency reference as well as capable of attaining synchronism automatically.

DESCRIPTION OF THE PREFERRED EMBODIMENT

Referring to the drawing, the invention is illustrated as embodied in a DC motor of the pulse type, including a base 10 supporting a stator 11 carried by its web 11a by means of posts 11b received in arcuate slots 10a in the base for angular adjusting movement. The stator includes a ferromagnetic, outwardly opening annular channel 12, with the upper and lower portions 13 and 14 of the channel being formed with a circumferential array of indentations or serrations 15 dividing the stator into a plurality of poles, each U-shaped in cross section. Received in the channel 12 common to all poles is a motor drive and control winding 16.

A rotor 18 is mounted on a bearing-supported shaft 17 coupled to a load L, such as the gear train coupled to hands of a clock, and including a counterrotating flywheel, preferably coaxial with the rotor, to render the motor insensitive to angular acceleration about the axis of rotation. The rotor is disposed coaxially with respect to the stator 11 and carries in a circumferential array around its periphery a series of magnetic members forming poles 19 complementary to the magnetic members or poles of the stator. As best seen in FIG. 2, the magnetic members 19 extend downwardly to the U-shaped pole faces, spanning the distance between the upper and lower portions of each pole to complete a flux loop with each through a pair of airgaps. The poles 19 can be integral with the rotor and magnetically passive, although if desired they can also take the form of permanent magnets (as shown in said copending application Ser. No. 721,965).

Mounted beneath the stator 11 and rotor 18 is a resonator which preferably takes the form of a cruciform plate resonator 20, such as described in U.S. Pat. No. 3,150,337. The resonator 20 is carried by a central, nodal point mounting pin 21 secured to the base 10 and disposed coaxially with respect to the central axes of the rotor 18 and stator 11. If desired, a soft mount can be used in place of the hard mount shown. As described in that patent, the four resonator arms 20a, 20b, 20c and 20d resonate up and down in a pattern in which one pair of aligned arms, say 20a and 20c, flex downward while the corresponding pair of aligned arms 20b and 20d flex upward, and vice versa. The resonator will operate at a precise, predetermined frequency much the same, for example, as a tuning fork, but is free of attitude errors and is relatively more stable under environmental influences, such as vibration and shock.

Carried at the free end of the resonator arms 20b and 20d are permanent magnets 22b and 22d which interact with the ferromagnetic poles 19 of the rotor 18 so that the pair of aligned resonator arms 20b and 20d will be pulled toward the rotor each time the rotor poles are aligned with the resonator magnets, but will be released each time the rotor poles straddle the resonator magnets. Thus, when the rotor turns at a certain critical speed, the resonator is driven or excited in a mode corresponding to its natural mode and the rotor and resonator are in synchronism. As such there are tiny magnetic forces, long recognized in the art, which tend to hold the rotor at synchronous speed. These small magnetic forces are insufficient for most practical applications to hold the rotor. While larger magnetic holding forces can be developed by tighter coupling using stronger magnets, the accuracy of the resonator is disturbed and poor timekeeping results. The present invention is concerned with other techniques for accomplishing precise speed control.

The resonator arms 20a and 20*Pickups* carry permanent magnets 22a and 22c facing the opposite direction from the magnets 20b and 20d. Associated with the resonator magnets 22a and 22c is a pickup 23 in the form of coils 23a and 23c connected in series. The sense of the winding of the coils can be the same or opposite, with appropriate magnet polarity to provide shock immunity. The motion of the arms generates a common pickup signal reflecting the resonant motion. It is not essential that there be pickups associated with two of the resonator arms, as shown. Pickups can be used on one, two, three or four arms. Similarly, the resonator can be driven from any number of its arms. Thus, if desired, the resonator and rotor can be offset. When the rotor 18 rotates, its poles 19 will pass the magnets 22 on the resonator, urging the resonator arms up and down as a function of the rotor speed, and when the rotor speed reaches a certain critical speed at which the resonator arms are excited at natural resonant frequency, the resonator will vibrate in its resonant mode with only very small amounts of energy taken from the rotor.

The drive and control circuitry for the motor includes a pair of transistors 24 and 25 comprising complementary stages in a complex switch function. The transistor 24 operates as an amplifier-phase inverter and provides a low-impedance input point for introducing resonator signals into the circuit. A DC power source, such as a battery 27, has its positive terminal connected to one terminal 16b of the drive and control winding 16 of the motor, the other terminal 16a of which is connected to the collector 25a of the transistor 25. The emitter 25b is connected through a resistor 28 to the negative terminal of the power source. Thus, there is provided a series circuit including the motor winding across the power source. The base 25c of the transistor 25 is connected to the collector 24a of the transistor 24, the emitter 24b of which is connected to one terminal 23a of the pickup windings 23 of the resonator 20. The other terminal 23b of the pickup windings is connected to the positive terminal of the power source 27 through a resistor 29, and to the negative terminal of the power source, preferably through a zener diode 30, which is used in the event extremely accurate operation over a very wide supply voltage range is desired. Otherwise, a simple resistor can be used. The voltage divider formed by resistor 29 and zener diode 30 or its replacement resistor acts to limit the maximum voltage applied through transistor 24 to base 25c and thus, through the action of negative feedback inherent in an emitter-follower configuration, acts to limit the current through motor winding 16.

The base 24c of the transistor 24 is connected to the transistor 25 in a dual feedback circuit. The circuit from the base 24c to the collector 25a includes series resistor 31 and series capacitor 33. This feedback path completes a circuit loop which is regenerative; that is, a change in voltage or current in the loop acts to increase that change until some limit is reached. The circuit from base 24c to the emitter 25b includes series resistors 31 and 34. This feedback path completes a loop which is degenerative; that is, a change in voltage or current acts to suppress or reduce further change. Although each feedback path has an effect on the other, their principal functions are seperable. The regenerative loop permits a relatively small voltage generated by rotor motion to switch the motor current while the degenerative loop holds transistors 24 and 25 within a desired operating condition over a wide range of supply voltage and ambient temperature. In the illustrated arrangement, a resistor 32 is included in the circuit from the power source to the control circuitry to provide voltage regulation in addition to that provided by the diode 30, but it can be omitted and the circuit opened.

The motor can be made self-starting by choosing appropriate circuit values to provide sufficient gain and by magnetically or otherwise displacing the rest position of the rotor slightly away from alignment with the stator. If, on the other hand, the system is arranged so that it is not self-starting, the motor is started by a slight kick or push in the desired direction of rotation. Fundamentally, the motor is capable of operating in either direction.

Assuming, for purposes of explanation, that the resonator 20 and its pickup coils 23 are not connected in the circuit, i.e. they are short circuited by a switch 35, the rotor will accelerate to a maximum speed determined chiefly by circuit parameters.

The to the is designed to utilize voltages generated in the motor by rotor motion to switch motor drive current on and off at appropriate positions of the rotor relative to the stator, and thus to accelerate or maintain the rotor in rotation. The voltage appearing across the motor winding has two principal components: (1) that due to current in the winding, and (2) that due to changes in the flux looping the winding as a result of changes in the airgap with rotor rotation. The amplitude of the latter voltage component increases with rotor speed, but it is important to note that the instantaneous maximum and minimum voltage values occur at substantially the same position of the rotor relative to the stator, irrespective of rotor speed. This latter voltage is used to switch motor current in a manner similar to the action of brushes in a conventional DC motor. Assuming that transistor 25 is conducting and that the rotor poles are approaching alignment with the stator poles, the flux looping the motor winding will be increasing. The increasing flux will induce a negative voltage at the terminal 16a of the winding until alignment of poles is reached when the induced voltage will be increasing in a positive direction. This voltage will then initiate circuit action to render the transistor 25 nonconducting. Conversely, with transistor 25 nonconducting and rotor poles at approximately maximum separation from stator poles, residual flux change will induce a negative going voltage at 16a, which voltage will initiate current turn-on. Thus, the current pulse to the motor will be timed by rotor position during rotation in such a way as to accelerate or maintain the motor in rotation. It should be noted that this desired action is not dependent upon the winding sense of the motor winding. Neither is this action dependent on the type of transistor used (PNP or NPN) or the direction of current flow through the motor as long as the functional elements of the circuit are retained.

In a preferred embodiment of this invention, the circuit and winding are made self-oscillatory in the absence of rotor motion. The self-oscillation frequency is determined by the time constants action is the circuitry and is the center of a band of frequencies over which the winding can actuate the switching means. When the rotor is turning at a speed to develop signal pulses at a frequency below the free-running frequency, circuit switching will be inhibited until an appropriate motor pulse is generated. The switching pulse will then be somewhat advanced in phase relative to the signal pulse. When the motor speed is such that signal pulses are above the free-running frequency of the circuit, then the period of switching pulses will be shortened to occur at signal frequency and in a retarded phase. A result of the above circuit action is to provide high acceleration at low speeds and a controllable upper limit to motor speed in which the circuit will assert itself to apply either decelerating effects (in the event of overspeed) or accelerating effects (in the event of underspeed). Variable speed control can, therefore, be achieved by varying the circuit parameters to vary the free-running frequency and the current limits. Motor control of switching pulses over a frequency range of several octaves centered approximately on the free-running frequency is readily achieved. In this fashion, and again assuming no resonator in the circuit, the system functions as a DC brushless motor in which the power pulse in the winding which results from the closing of the switching transistor 25, occurs periodically at points of rotor rotation which are advantageously determined by the cooperation of rotor-generated voltages and the natural switching time constants of the circuitry. The effect of windage, friction and load torque is to reduce the controllable upper limit of motor speed.

If instead of the astable characteristics of the circuit, i.e. self-oscillation or spontaneous switching, the circuit is made bistable, the motor action as described for the astable configuration would be modified so that the top speed of the rotor would be determined by windage and friction rather than circuit parameters. This can be done, for example, by removing the capacitor 33, neutralizing the inductive aspect of the motor winding (as by connecting a resistor-capacitor circuit in parallel with the winding) and adjusting amplifier gain. In such case, speed control is achieved by controlling the current limits using, for example, the current-limiting means of the system which is a combination of the degenerative feedback path and the inherent negative feedback of the emitter-follower configuration of the power-switching transistor.

If it is desired to utilize the regime as described above (i.e. without the coupled resonator 20) as a mechanical oscillator and therefore a timekeeper using only the rotor 18, the rotor can be converted to a resonator by coupling it to the frame through a hair spring. In such case, the multiple-pole structure should preferably be reduced in number and width of poles in relation to hair spring resiliency so that the amplitude of oscillation of the rotor is less than 180 electrical degrees, but with sufficient displacement for ratchet or coupling means to the load or gear train, all of which is well known in the art. In a "resonant rotor" motor, the use of self-oscillation in the absence of rotor motion has materially different effects and purposes. It will be understood, therefore, that the use of the term "rotor" herein defines a member which is nonresonant, i.e. which moves continuously in one direction or the other.

Assuming now that the resonator 20 is in the circuit (the phantom shorting circuit 35 being open), and that the rotor is free-turning for unidirectional motion, the resonator will become excited into resonance as the speed of the rotor achieves the ultimate synchronous speed (i.e. that precisely keyed to resonator frequency), this through the action of the rotor poles passing the magnets 22$b$ and 22$d$ on the resonator arms 20$b$ and 20$d$ respectively, all as described above. The outputs of the resonator pickup coils 23 are such that they control the firing of the transistor 24. At the moment when the motor pulse is going negative and would normally turn on the power circuit through the motor windings 16 and the transistor 25, the resonator also produces a negative voltage which prevents the free-running oscillator circuit from turning on. Only when the resonator output signal goes positive is the oscillator circuit turned on and this occurs at approximately 90° spacing of the rotor poles from the stator poles. Similarly, at 0° or alignment of rotor and stator poles where the motor pulse is going positive and would turn off the oscillator, the resonator output is also positive and prevents the turnoff, thus establishing a so-called retarding pulse portion in the winding 16 which endures until the resonator signal goes negative and turns off the power circuit. Thus, the motor functions in the manner of a conventional synchronous motor in which the duration of the retarding portion of the pulse (always substantially less than the accelerating portion) measures the degree of surplus torque which the motor is able to generate to meet increasing loads. In this respect, the function of the circuit is similar to that described in the applicant's copending application Ser. No. 721,965, filed Apr. 17, 1968, and is distinguishable from the system described having reference to FIGS. 5–7 of the applicant's copending application Ser. No. 763,803, filed Sept. 30, 1968.

It should be understood that for most applications of the motor control system, the dominance of the resonator-generated signal (pickup coils 23) over the rotor-generated signals should not be so substantial that the desired interaction of signals cannot take place, it being desirable that the rotor-generated signal be active in the rapid recovery of synchronism in the case of loss of synchronism below synchronous speed due to external disturbances. Conversely, upward acceleration due to rotor signal action should not be so great that the rotor will pass through synchronism, either initially or upon losing synchronism, before the resonator reaches sufficient amplitude to control the timing of motor pulses. Acceleration at synchronous speed in the absence of resonator signal can be controlled, in accordance with the invention, by selecting the upper limit of motor speed, as previously discussed, to a value substantially at or above but not excessively higher than the synchronous speed. Also, it will be understood that various modifications can be made within the scope of the invention. Thus, transistor 24 can be changed from PNP to NPN and transistor 25 from NPN to PNP, with the battery polarity being be reversed. Or, with minor circuit changes, both transistors can be NPN or both can be PNP. Also, the motor can be operated in a repulsion mode, in which so the pole members 19 should be permanent magnets and the appropriate sense should be selected for the coils. Also, the rotor can be coupled to the resonator so that the resonator becomes a rotor part, in which case it will be readily apparent that the resonator excitation will be derived from magnetic interaction between the resonator and the stationary frame, all as set forth in said copending application Ser. No. 763,803.

If desired, additional circuitry can be provided which is responsive to a decay of the resonator signal to furnish an indication that synchronous speed has been lost. Or, if desired, such supplemental circuitry can be used as an additional means to coerce the system back to synchronism. It will be further understood that the control circuitry can be used independently of the resonator as a DC motor controller, but that with the resonator integrated electrically and mechanically into the system, there is cooperative action between the two which results in a precision timing device having the advantages of accuracy, simplicity and resistance to environmental disturbances or changes as well as supply voltage changes. The invention should not, therefore, be regarded as limited except as defined in the appended claims.

I claim:

1. In a DC motor: a motor winding; magnetic pole structure inductively coupled with the winding and including complementary rotor and stator portions; means to mount the rotor for continuous rotation in one direction or the other; means to connect a DC source to the winding; circuit means including a power circuit portion and a control circuit portion and having electronic switching means to connect the DC source to the winding to control the energization of the winding from the source, said circuit means and winding means being self-oscillatory in the absence of rotor motion; and means to connect the winding to the control circuit portion to modify the action of said control circuit portion by voltage due to rotor motion through electromagnetically generated signals in the motor winding to actuate the switching means, whereby the switching action accelerates rotor motion to a desired speed and thereafter maintains such speed.

2. A DC motor as in claim 1, said circuit means being self-oscillatory at a frequency which is the center of a band of frequencies over which the winding can actuate the switching means when the rotor is turning, said self-oscillatory circuit means thereby controlling an upper limit to the speed of the rotor.

3. A DC motor as in claim 1, including means to connect the circuit means to a DC source independently of the motor winding.

4. A DC motor as in claim 1, said control portion including a phase inverter.

5. A DC motor as in claim 1, including an amplifier stage and a regenerative feedback path connected between the winding and the input to the amplifier stage and responsive to voltages appearing across the winding.

6. A DC motor as in claim 5, including a degenerative feedback path connected between the power circuit portion and the input to the amplifier stage and responsive to current passing through the winding.

7. A DC motor as in claim 1, including a mechanical resonator having an electromagnetic signal pickup generator responsive to resonator motion, means to couple the rotor to the resonator to excite the resonator into its natural frequency of vibration when the rotor is at a speed corresponding to resonator frequency, and means responsive to the pickup signals generated by the resonator at resonance to actuate the switching means, said switching means including means responsive to the phase of the resonator signals to cause the resonator signals to dominate the switching action.

8. A DC motor as in claim 2, of a mechanical resonator having an electromagnetic signal pickup generator responsive to resonator motion, means to couple the rotor to the resonator to excite the resonator into its natural frequency of vibration when the rotor is at a speed corresponding to resonator frequency, said resonator frequency being substantially at or below the frequency corresponding to the maximum speed at which the rotor will turn without the resonator, and means responsive to the pickup signals generated by the resonator at resonance to energize the motor winding, whereby the controlled upper limit of rotor speed due to the selected self-oscillation frequency approximates synchronous speed as controlled by the resonator, thereby enabling the resonator to capture the rotor.

9. A DC motor as in claim 8, including current-limiting means, said current-limiting means including a degenerative feedback path connected between the power circuit portion and the input to the amplifier stage and responsive to current passing through the winding.

10. In a DC motor: a motor winding; magnetic pole structure inductively coupled with the winding and including complementary rotor and stator portions; means to mount the rotor for continuous rotation in one direction or the other; means to connect a DC source to the winding; circuit means including a power circuit and a control circuit and having bistate electronic switching means connected in series with the DC source and the winding to control the energization of the winding from the source; means to connect the winding to the control circuit, said control circuit being responsive to rotor motion through electromagnetically generated signals in the motor winding to actuate the switching means; and current-limiting means independent of the DC source voltage to the winding.

11. A DC motor as in claim 10, including an amplifier, said current-limiting means including a degenerative feedback path connected between the power circuit portion and the amplifier.

12. A DC motor as in claim 10, including an amplifier and a regenerative feedback path from the winding to the amplifier.

13. A DC motor as in claim 12, said current-limiting means including a degenerative feedback path connected between the power circuit portion and the amplifier.

UNITED STATES PATENT OFFICE
CERTIFICATE OF CORRECTION

Patent No. 3,609,487               Dated September 28, 1971

Inventor(s)        William W. Allison

It is certified that error appears in the above-identified patent and that said Letters Patent are hereby corrected as shown below:

Col. 1, lines 41 and 42, cancel "resonator can be coupled" and substitute --motor winding can form--

" 1, line 59, change "mecanical" to --mechanical--

" 1, " 63, change "controlthe" to --control the--

" 1, " 74, after "circuit" insert --diagram--

" 2, " 68, change "20Pickups" to --20c--

" 3, " 74, change "to the" to --circuitry--

" 4, " 36, change "action is" to --of--

" 5, " 75, before "reversed", cancel "be"

" 6, " 3, change "so" to --case--

" 6, " 72 (claim 8), after "claim 2," change "of" to --including--

" 8, " 2 (claim 10), before "electronic", change "state" to --stable--.

Signed and sealed this 18th day of April 1972.

(SEAL)

Attest:

EDWARD M. FLETCHER, JR.
Attesting Officer

ROBERT GOTTSCHALK
Commissioner of Patents